United States Patent Office 2,969,337
Patented Jan. 24, 1961

2,969,337
NON-SAGGING JOINT SEALING COMPOSITIONS

Manfred E. Goodwin, Haddonfield, Edgar W. Sawyer, Jr., Metuchen, and Homer A. Smith, Berkeley Heights, N.J., assignors to Minerals & Chemicals Philipp Corporation, a corporation of Maryland No Drawing. Filed Dec. 3, 1958, Ser. No. 777,849

14 Claims. (Cl. 260—22)

The present invention relates to improved joint sealing or filling compounds which are substantially free from sag under the influence of heat and is a continuation-in-part of our copending U.S. application, Serial No. 618,695, filed October 29, 1956 which issued into U.S. Patent 2,894,848 on July 14, 1959. The invention particularly concerns improved joint sealing compounds such as, for example, the spotweld sealers required by the automotive industry for filling and sealing the spotweld seams between top and drip rail, between top assembly and side panel, between cowl and sides of automobiles, etc. Such sealers are applied to the appropriate site prior to painting and the enamel is then baked. Other joint filling compounds exemplary of the present invention are improved joint fillers of the type introduced between road paving blocks or bricks and between sections of concrete pavement.

Automotive sealers, such as the aforesaid spotweld sealers, are employed to fill in and seal welded seams so that the seam will not leak moisture and will be protected from corrosion. The sealer should be of such composition that it will not bleed through subsequently applied paint films or alter the strength of the weld in any way. Further, the sealer should have resistance to sag at paint baking temperatures. The term sag, as used in the joint sealing art, refers to the tendency of a sealer to flow. Paint or enamel baking temperatures in the automotive industry usually run from about 275° F. to about 500° F. and joint sealing compounds should not soften at these temperatures to the extent that they sag appreciably and tend to flow out of their seams.

A filler for pavement joints should be of such character as to adhere to the paving blocks or sections so that it does not loosen or chip in cold weather under the rigors imposed by traffic and contracting or settling of pavement and it should not soften under high summer temperatures to the extent that it flows out of the joints.

Joint sealing or caulking compounds are commonly prepared by mechanically blending asphaltic material or paint or varnish vehicles with substantial quantities of fillers to provide the requisite body. Although such compounds perform satisfactorily for most purposes, nevertheless, when subjected to elevated temperatures such compounds melt or sag with disastrous effect.

It is thus a principal object of the present invention to provide improved joint sealing and filling compositions which resist softening and sag at elevated temperatures.

It is another object of the invention to provide improved joint sealing compositions for use in automotive weld seams which substantially resist sag when subjected to paint baking temperatures up to about 500° F.

It is still another object of the invention to provide improved pavement joint fillers which are nonflowing even during hot summer weather.

Another object of the invention is the provision of joint sealing and filling compositions which resist softening and sag at elevated temperatures although they are suitable for application with no preliminary heat softening.

These and further objects and advantages are realized in accordance with the present invention wherein improved joint sealing compositions are provided by colloidally dispersing a finely divided inorganic solid in a resinous coatings vehicle which would, in the absence of the colloidally dispersed finely divided solid, sag appreciably or flow at elevated temperatures.

The joint sealing compounds of our invention are useful in those applications in which it is required that sealers be free from sag at temperatures of the order of 275° F. to 500° F. and represent a marked advance over prior art sealers based on thermoplastic resins wherein inorganic solids are present merely as fillers and have been simply mechanically blended with the resinous material rather than colloidally dispersed.

Although not wishing to be bound by any postulated theory as to the physical character of our novel joint sealing compositions, it appears to be the case that such a composition is reinforced by an internal gel-like structure, probably attributable to the colloidal dispersion of the finely divided solid therein, which prevents sag even when the composition is heated to a temperature sufficiently high to soften it.

Briefly stated, joint sealing compositions of the present invention comprise a resinous coatings vehicle which is normally capable of forming a permanently thermoplastic film at room temperature, an imidazoline type dispersing agent and a clay having a high surface area colloidally dispersed in said coatings vehicle. Normally, a reinforcing filler mineral and a plasticizer are also present in the joint sealing composition.

The coating vehicles to which reference is made herein are in liquid state or are liquifiable below about 220° F. and comprise as an essential ingredient a resinous material of natural or synthetic origin, the resin usually being oil modified, plasticized or solvent diluted. Typically, the coatings vehicle is a varnish, oleoresinous varnish, paint vehicle or other protective coatings vehicle. The nonvolatile portion of the vehicle (vehicle nonvolatiles) may include a plasticizer, in addition to the coatings resin. The joint sealing compound may also contain siccatives, solvents, antioxidants, fillers, ultraviolet stabilizers, diluents, reinforcing agents, etc.

The joint sealing compounds of our invention may be provided in various consistencies, viz., as thin gels or puttylike masses or in strip form. However, they all have in common the characteristic of being substantially free from sag at the elevated temperatures to which they must be subjected in use. Certain of the sealing compositions within the scope of our invention are of such consistency that they can be applied with no, or at least a minimum of, preliminary heat softening treatment; such materials can readily be applied, for example, to automotive weld seams with a caulking gun or the like. However, other compositions of our invention are solid or semi-solid masses and may be heated to soften them to a certain extent prior to application to the intended site. While such preheating does, in many cases, have a softening effect on the compositions and thus makes them easier to apply, such softening is not accompanied by sagging.

The method of preparation of joint sealing compositions of our invention is subject to some variation; all of the methods, however, require the colloidal dispersion of the clay in the coatings vehicle or a portion thereof in the presence of the imidazoline under high shear conditions. Suitable high shear apparatus includes roller mills, colloid mills, Waring Blendor or the like.

More specifically, in accordance with our invention, the coatings vehicle we employ in the preparation of our improved joint sealing compounds are those which comprise a resinous material and which are normally capable at ambient temperature of forming a thermoplastic film by evaporation of solvent, oxidation or by drying. Thermosetting resins are not suitably employed in the preparation of our joint sealers, because the joint sealing compound formulated therewith will be undesirably rigid and shrink after being subjected to elevated temperatures. Likewise, resins which polymerize at ambient temperature are not suitable. The coatings vehicle must be normally liquid or liquifiable at a temperature less than about 220° F. by heat or by admixture with organic liquids so that the colloidal clay may be dispersed therein.

The preferred vehicle is one based on an alkyd coatings resin, such a resin being the esterification product of a polybasic acid (saturated or unsaturated) and a polyhydric alcohol, modified with fatty oils or fatty acids (saturated or unsaturated). As an example of a suitable alkyd may be cited an oil modified glycerol phthalate resin containing 65 percent linseed oil. In the case of alkyd resins, the sole nonvolatile component of the vehicle may be the alkyd itself in the case of long oil alkyds. With other alkyds, plasticizers and/or solvents will be employed and the vehicle formulated as in the preparation of a protective coating based on the alkyd, this being well-known to those skilled in the art.

Another eminently suitable vehicle is a varnish or oleoresinous varnish, the latter being prepared by incorporation into a natural, synthetic or treated drying oil of a thermoplastic coatings resin such as, for example, modified and unmodified rosin esters, phenolic resins of the permanently thermoplastic type, petroleum and coal tar derived resins, natural gums such as kauri, congo, dammar, etc.

Another class of coatings vehicles are those whose resinous component is based on derivatives of cellulose, e.g., cellulose nitrate, cellulose acetate, cellulose acetate butyrate and propionate, and ethyl cellulose. When this class of resins is used in the preparation of compositions of the present invention, the joint fillers containing these resins are applied to a joint or seam, and then are sanded to produce a smooth contour or uniform surface. Thereafter a protective coating may be applied thereon and baked to accomplish curing of the protective coating.

Yet another class of thermoplastic coatings resins which is particularly suitable for making expansion joint fillers for bridge abutments and pavement joints are those products of the addition polymerization of unsaturated monomers, such as polyvinyl chloride, polyvinyl acetate, polyacrylates, polyacrylonitriles, etc., and various copolymers thereof. Chlorinated rubber and those rubbers known as thermoprenes, all of which are permanently thermoplastic, are also suitable for purposes of the instant invention. The liquid component of the vehicle used in conjunction with the resin formed by addition polymerization may be a solvent for the resin, or a plasticizer such as dioctyl phthalate.

Care must be exercised to exclude from the joint sealing compounds agents which will cause the normally permanently thermoplastic resinous material to become thermosetting either under ambient conditions or at elevated temperatures to which they are subjected during use.

In the preparation of the joint sealing compositions of our invention we employ as our colloidal clay component, any naturally occurring clay which has a surface area, after drying to a temperature of 350° F., of 50 square meters per gram or more, and preferably 100 square meters per gram or more. By surface area, as mentioned above, is meant that surface area which is determined by a nitrogen adsorption method described by S. Brunauer, P. H. Emmet and E. Teller in their article entitled "Adsorption of Gases in Multi-Molecular Layers," on page 309 of Journal of the American Chemical Society, vol. 60, February 1938, using the molecular size data of H. K. Livingston presented in his article entitled "Cross-Sectional Areas of Molecules Adsorbed on Solid Surfaces," on page 569, Journal of the American Chemical Society, vol. 66, April 1955. Clays particularly amenable to the process of the present invention include the sub-bentonites which are a class of nonswelling montmorillonite clays, nontronite, illite, hectorite, beidellite, saponite, halloysite and attapulgite. The surface area of each of the above-identified clays is in excess of 50 square meters per gram. Attapulgite, which we have found to be particularly suitable in the practice of our invention, possesses a surface area, as measured by the above-identified method, of about 200 square meters per gram.

As our colloidal clay we prefer, for economic reasons, to use crushed unrefined attapulgite clay. However, we may use attapulgite from which undispersed clay agglomerates, fine quartz, other foreign matter, etc., have been partially or substantially removed. Activated noncolloidal grades of attapulgite are not suitable. Activated attapulgite is prepared by thermally removing chemically bonded water from the attapulgite lattice. Suitable attapulgite clay has a volatile matter content of at least about 7 percent and usually within the range of from about 10 to about 50 percent. By "volatile matter content," as the term is used above, is meant the weight percent of the clay which can be removed by heating the clay to essentially constant weight at a temperature of 1800° F.

The dispersing agents which we have found most suitable for our purpose are the surface active imidazolines which are the reaction products of fatty acids and N-substituted ethylene diamines conforming to the general structure:

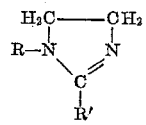

where R, the N-substituted substituent, can be an alkylol group containing from 2 to 18 carbon atoms, a radical containing an alkyl amino group and having from 2 to 18 carbon atoms, or an alkyl or alkylene group containing from 2 to 18 carbon atoms, and R' can be an alkyl or alkylene group of from 11 to 21 carbon atoms. Typical examples of the imidazoline type dispersing agents are: Amine O, prepared by reacting oleic acid and amino ethyl ethanolamine; Amine S, prepared from stearic acid and amino ethyl ethanolamine; Amine C, prepared from lauric acid and amino ethyl ethanolamine; and Amine 220, which is believed to be similar to Amine O. Amine O has been identified as 1-beta-hydroxyethyl-2-heptadecenyl imidazoline. Mixtures of imidazolines can, of course, be employed in the process of our invention.

We have discovered, after much experimentation, that the aforesaid imidazolines are superior dispersing agents for our clays, and particularly for our preferred attapulgite clays. The attapulgite clays are substantially undispersible in organic liquids without the aid of the dispersing agent and comparable joint sealing compositions are not prepared in the absence of the imidazoline. We have found imidazolines, of the above-disclosed class, to be excellent and relatively inexpensive dispersing agents for our clays and, in addition, we have found that they possess the added advantage of cooperating to produce final joint sealing compounds of excellent water resistance and antisagging tendencies at elevated temperatures. Consequently, the use of imidazolines as dispersing agents in our process is considered to be an important and critical part of said process and essential thereto. However, although we wish to make it clear that the use of the aforesaid imidazolines as dispersing agents in our process is essential thereto, we wish to make it equally clear that other suitable dispersing agents may be employed in conjunction with said imidazolines (but not in place of them), as desired. Dispersing agents suitable for use in our process in conjunction with the imidazolines should preferably be compatible with the imidazolines and they should not contribute substantially to lowered water resistance, or detract substantially from the antisag properties of the joint sealing compounds.

The weight ratios of the principal ingredients of our joint sealing compounds should, for best results, be substantially as follows: the weight ratio of volatile-free clay to the weight of vehicle nonvolatiles of the coatings vehicle is within the range of from about 1 to 2 to 1 to 20 and the weight ratio of the volatile-free clay to the imidazoline is within the range of 2 to 1 to 10 to 1 and sufficient to permit colloidal dispersion of the clay in the coatings vehicle. "Volatile-free clay" refers to the clay after heating to essentially constant weight at about 1800° F. The resin may constitute from about 50 percent to 100 percent of the vehicle nonvolatiles in the coatings vehicle and the plasticizer may be used in amount up to 50 percent of the vehicle nonvolatiles.

The reinforcing filler (or fillers generally) may be present in small or substantial quantity. A solvent, when used, may be included in the formulation in any quantity which will result in a finished composition of the desired consistency. However, as a rule not more than about 50 percent volatiles, based on the total composition weight, should be used and usually less than about 20 percent.

The optimum mode of preparation of the joint sealing compositions of this invention is dictated to a large extent by the nature of the resin on which the coatings vehicle is based. For example, when the pure resin is a liquid, such as a long oil alkyd, the clay may be dispersed directly into the resin in the presence of the imidazoline material employing high shear; a solvent or solvents and/or plasticizer may be employed if required. The order of addition of materials is immaterial.

When the resin is a solid or semisolid we may blend the resin with appropriate plasticizer and/or solvent and diluent to liquify the resin and colloidally disperse the clay in the resin thus liquified. When the resin is a solid or semisolid we may, alternatively, initially gel an organic liquid which is a portion of the vehicle, such as the plasticizer and/or solvent, by subjecting such organic liquid to high shear with clay and imidazoline and, thereafter, blend the resin, softened by heat or by plasticizer and/or solvent, into the gel. The necessary properties for the organic liquid in which the clay is dispersed in such a case are: it must permit colloidal dispersion of the clay therein; it must be compatible with the coatings resin; it should impart no undesirable characteristics to the final product such as, for example, lowered resistance to sag at elevated temperatures, lowered water resistance and various other effects which would be deleterious to the compositions of this invention. The order in which the colloidal clay, dispersing agent and auxiliary organic liquid are mixed is immaterial. Thus, the dispersing agent and organic liquid may be mixed first followed by the addition and mixing in of the clay; the clay and organic liquid may be mixed first and then the dispersing agent incorporated, or all three components may be mixed simultaneously. We have discovered that when this procedure is used the optimum proportions of ingredients for the thickened organic liquids are from about 1 to about 25 percent by weight of colloidal clay on a volatile-free basis, and from about ½ to about 10 percent by weight of dispersing agent, with the remainder comprising the organic liquid.

The following examples of our invention are included for purposes of illustration only. It should be clearly understood that the invention is not limited to these illustrative embodiments since many other embodiments exist within its scope.

*Example I*

This is an example of the preparation of an automotive sealing compound in which the coatings resin component of the vehicle is an alkyd resin.

A mixture of alkyd resin with mineral spirits thinner, grit-free colloidal attapulgite containing about 28 percent free moisture, and cationic surface active agent was prepared by stirring the ingredients for 15 minutes in a laboratory turbomixer. The alkyd resin was Beckosol P-470-70, a phthalic soya resin product containing 30 percent mineral spirits as a thinner. The surface active agent was Amine C, which comprises the reaction product of lauric acid and amino ethyl ethanolamine. The proportions of ingredients were 84.74 percent Beckosol P-470-70, 11.97 percent Permagel, and 3.29 percent Amine C. Permagel is a grit-free colloidal attapulgite clay containing 35 percent volatile matter.

The stirred mixture from the turbomixer was passed once through a Tri-Homo colloid mill to form the final sealing compound. The mill was operated at a rotor speed of 10,000 r.p.m. and a rotor clearance of 0.002 in.

The sealing compound was treated for thermal stability by applying a thick drawdown thereof to a brass panel, placing the panel in a near vertical position in an oven, leaving the panel in the oven for three hours during which said oven was maintained at a temperature of 300° F., and, finally, observing the condition of the drawdown after the oven heating treatment. The sealing compound was observed to be free of sagging or melting tendencies as a result of this test.

*Example II*

In this example, an automotive sealing compound in which the vehicle is a pure alkyd is illustrated.

A mixture is formed (in parts by weight) of 82 parts of a nonvolatile, long oil, pure alkyd resin (Aroplaz 1400), 14 parts Attagel 20 (a colloidal fluid energy milled grade of attapulgite containing abut 15.0 percent free moisture) and 4 parts of Amine O. The mixture is then passed through a Tri-Homo colloid mill as in Example I. To the gelled material thus formed, 0.1 part of a 6 percent cobalt naphthenate solution and 10 parts of asbestos fiber shorts are added in a kneader or any suitable equipment until a homogeneous mixture is obtained.

*Example III*

This example is identical with Example II with the exception that a 30 gallon oil (linseed) length estergum varnish containing 30 percent by weight of mineral spirits is substituted for the Aroplaz 1400.

*Example IV*

This example is identical with Example II with the exception that short glass fiber is substituted for the asbestos fiber shorts.

*Example V*

This example illustrates the use of Parlon, a chlorinated rubber, in our novel joint sealing compounds. The following formula is given in parts by weight:

| | |
|---|---|
| Parlon, 10 cps | 100 |
| Chlorinated paraffin, (40 percent chlorine) | 40 |
| High flash naphtha | 350 |
| Attagel 20 | 70 |
| Amine O | 20 |
| Ground silica, 325 mesh | 150 |

The first three ingredients are mixed with a propeller-type mixer until a solution is obtained. The Attagel 20 and Amine O are then added and mixed in until homogeneous. The mixture is then passed through a suitable colloid mill to gel the mixture and the ground silica is slowly incorporated by kneading. The compound is particularly useful where exposure to corrosive chemicals may be encountered.

*Example VI*

In this example the use of ethyl cellulose in our joint sealing compositions is illustrated. The ingredients are listed in parts by weight:

| | |
|---|---|
| Ethyl cellulose, N-14 type | 10 |
| Maleic-modified ester gum | 5 |
| Raw castor oil | 5 |
| 4:1 toluene:ethanol | 80 |
| Hectorite | 10 |
| Amine O | 3 |
| Ground limestone, 325 mesh | 10 |

The first four ingredients are mixed until a solution is obtained. The hectorite and Amine O are added and mixed in until homogeneous. The mixture is then gelled, as in Example V, and the limestone thoroughly admixed.

*Example VII*

This example illustrates the use of a vinyl chloride coatings resin in our sealing compositions. As in the previous examples, the ingredients are given in parts by weight:

| | |
|---|---|
| Geon 200 X 20 | 35 |
| Dioctyl phthalate | 2 |
| Xylene | 70 |
| Saponite | 15 |
| Amine O | 5 |
| Dibasic lead phthalate | 1 |
| ASP 400 | 10 |

The first three ingredients are mixed to dissolve the resin. The saponite and Amine O are added, mixed in until uniformly dispersed and the mixture is gelled. The last two ingredients are then incorporated in a ribbon blender or any suitable equipment. The Geon 200 X 20 is a vinyl chloride resin and the ASP 400 is a coarse fractionated kaolin clay.

We claim:

1. A composition for filling joints which is substantially free from sag at elevated temperatures and comprising a coatings vehicle normally capable of forming a thermoplastic film at room temperature, said coatings vehicle comprising a nonvolatile portion including a coatings resin in an amount within the range of from 50 percent to 100 percent, based on the weight of the vehicle nonvolatiles, a naturally occurring colloidal clay having a surface area after drying to a temperature of 350° F. of at least 50 square meters per gram colloidally dispersed in said coatings vehicle and an imidazoline of the following structural formula:

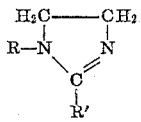

wherein R is selected from the group consisting of alkylol groups containing from 2 to 18 carbon atoms, radicals containing an alkyl amino group and having from 2 to 18 carbon atoms, alkyl and alkylene groups containing from 2 to 18 carbon atoms, and R' is selected from the group consisting of alkyl and alkylene groups having from 11 to 21 carbon atoms, wherein the ratio of the weight of volatile-free clay to the weight of the vehicle nonvolatiles of said coatings vehicle is within the range of from about 1 to 2 to 1 to 20 and the weight ratio of the volatile-free clay to said imidazoline is within the range of 2 to 1 to 10 to 1 and sufficient to permit colloidal dispersion of said clay in said coatings vehicle.

2. The composition of claim 1 in which said coatings resin is an alkyd resin.

3. The composition of claim 1 in which said imidazoline is 1-beta-hydroxyethyl-2-heptadecenyl imidazoline.

4. The composition of claim 1 including a filler.

5. A composition for filling joints which is substantially free from sag at elevated temperatures and comprising a coatings vehicle normally capable of forming a thermoplastic film at room temperature, said coatings vehicle comprising a nonvolatile portion including a coatings resin in an amount within the range of from 50 percent to 100 percent, based on the weight of the vehicle nonvolatiles, attapulgite clay colloidally dispersed therein and an imidazoline of the following structural formula:

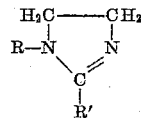

wherein R is selected from the group consisting of alkylol groups containing from 2 to 18 carbon atoms, radicals containing an alkyl amino group and having from 2 to 18 carbon atoms, alkyl and alkylene groups containing from 2 to 18 carbon atoms, and R' is selected from the group consisting of alkyl and alkylene groups having from 11 to 21 carbon atoms, wherein the ratio of the weight of volatile-free attapulgite clay to the weight of the vehicle nonvolatiles of said coatings vehicle is within the range of from about 1 to 2 to 1 to 20 and the weight ratio of the volatile-free attapulgite clay to said imidazoline is within the range of 2 to 1 to 10 to 1 and sufficient to permit colloidal dispersion of said clay in said coatings vehicle.

6. The composition of claim 5 wherein said imidazoline is 1-beta-hydroxyethyl-2-heptadecenyl imidazoline.

7. The composition of claim 5 wherein said coatings resin is an alkyd resin.

8. The composition of claim 5 including a filler.

9. A composition for filling joints which is substantially free from sag at elevated temperatures and comprising an oleoresinous varnish including from 50 to 100 percent of a resin, based on the vehicle nonvolatile content of said varnish, a naturally occurring colloidal clay having a surface area after drying to a temperature of 350° F. of at least 50 square meters per gram colloidally dispersed in said oleoresinous varnish and an imidazoline of the following structural formula:

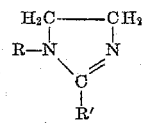

wherein R is selected from the group consisting of alkylol groups containing from 2 to 18 carbon atoms, alkyl radicals containing an amino group having from 2 to 18 carbon atoms, alkyl and alkylene groups containing from 2 to 18 carbon atoms, and R' is selected from the group consisting of alkyl and alkylene groups having from 11 to 21 carbon atoms, wherein the ratio of the weight of volatile-free clay to the weight of the vehicle non-volatiles of said oleoresinous varnish is within the range of from about 1 to 2 to 1 to 20 and the weight ratio of the volatile-free clay to said imidazoline is within the range of 2 to 1 to 10 to 1 and sufficient to permit colloidal dispersion of said clay in said oleoresinous varnish.

10. The composition of claim 9 in which said clay is attapulgite clay.

11. The composition of claim 10 in which said imidazoline is 1-beta-hydroxyethyl-2-heptadecenyl imidazoline.

12. A composition for filling joints which is substantially free from sag at elevated temperatures and comprising essentially a long oil alkyd resin, a naturally occurring colloidal clay having a surface area after drying to a temperature of 350° F. of at least 50 square meters per gram colloidally dispersed in said alkyd resin and an imidazoline of the following structural formula:

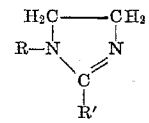

wherein R is selected from the group consisting of alkylol groups containing from 2 to 18 carbon atoms, radicals containing an alkyl amino group and having from 2 to 18 carbon atoms, alkyl and alkylene groups containing from 2 to 18 carbon atoms, and R' is selected from the group consisting of alkyl and alkylene groups having from 11 to 21 carbon atoms, wherein the ratio of the weight of volatile-free clay to the weight of said alkyd resin is within the range of from about 1 to 3 to 1 to 20 and the weight ratio of the volatile-free clay to said imidazoline is within the range of 2 to 1 to 10 to 1 and sufficient to permit colloidal dispersion of said clay in said alkyd resin.

13. The composition of claim 12 in which said clay is attapulgite clay.

14. The composition of claim 12 in which said imidazoline is 1-beta-hydroxyethyl-2-heptadecenyl imidazoline.

References Cited in the file of this patent

UNITED STATES PATENTS 2,757,160    Anderson _____ July 31, 1956